W. A. HATCHER.
CLUTCH MECHANISM FOR TRANSMITTING ROTARY MOTION.
APPLICATION FILED MAR. 18, 1911.
1,162,605.
Patented Nov. 30, 1915.
2 SHEETS—SHEET 1.
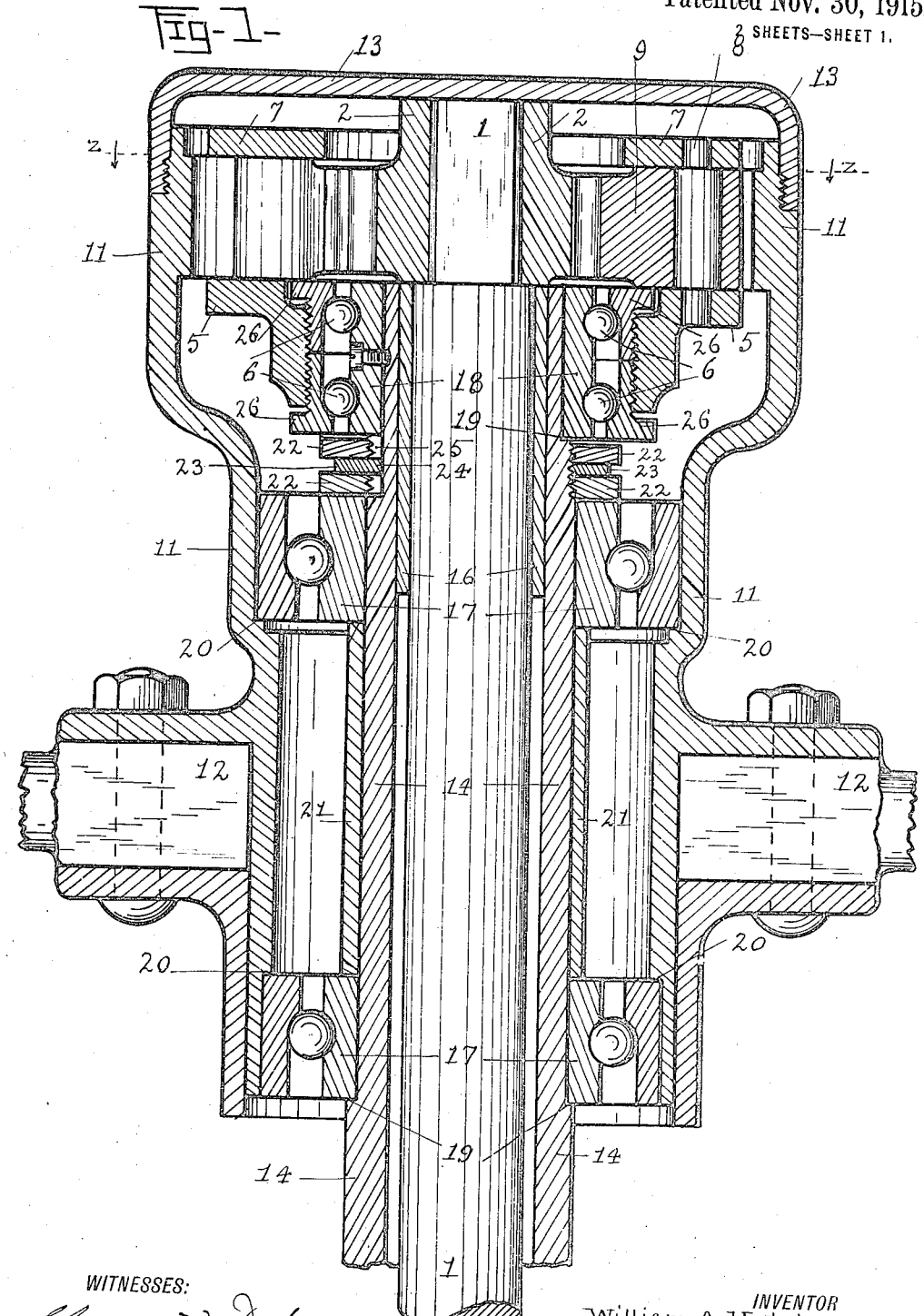
WITNESSES:
Charles W Dake
Harry J. Johnson
INVENTOR
William A. Hatcher
BY
Wilson Wilson & Rice
ATTORNEYS W. A. HATCHER.
CLUTCH MECHANISM FOR TRANSMITTING ROTARY MOTION.
APPLICATION FILED MAR. 18, 1911.
1,162,605.
Patented Nov. 30, 1915.
2 SHEETS—SHEET 2.
Fig-2-
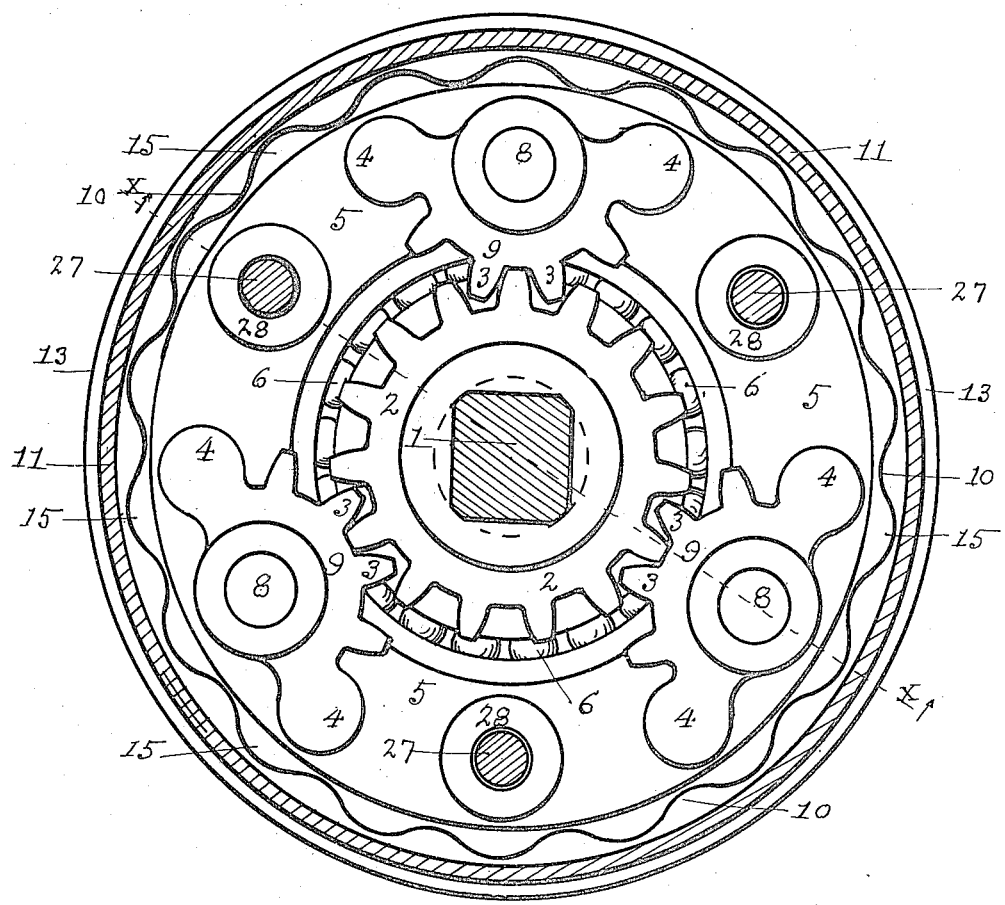
Fig-3-
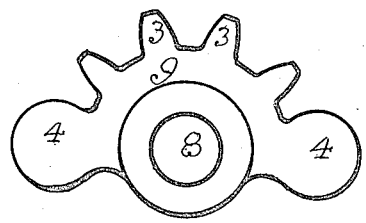
WITNESSES:
Charles W Dake
Harry J Johnson
INVENTOR
William A. Hatcher,
BY
Wilson Wilson & Rice
ATTORNEYS

UNITED STATES PATENT OFFICE.

WILLIAM A. HATCHER, OF GRAND RAPIDS, MICHIGAN.

CLUTCH MECHANISM FOR TRANSMITTING ROTARY MOTION.

1,162,605. Specification of Letters Patent. Patented Nov. 30, 1915.

Application filed March 18, 1911. Serial No. 615,189.

*To all whom it may concern:*

Be it known that I, WILLIAM A. HATCHER, a citizen of the United States, residing at Grand Rapids, in the county of Kent and State of Michigan, have invented new and useful Improvements in Clutch Mechanisms for Transmitting Rotary Motion, of which the following is a specification.

My present invention relates to clutch mechanisms for transmitting rotary motion, as especially adapted to the driving parts of automobiles and other self-moving vehicles.

The "differential gears" in common use permit the traction wheels of such vehicles to rotate at different speeds as on curves, but any increase in the rotary speed of one wheel above the engine speed ratio is necessarily accompanied by a corresponding decrease in the rotary speed of the other wheel below such engine speed ratio, and vice versa; the vehicle has therefore a strong tendency to swerve as the wheel either meets an obstruction or slips; vibration results, friction is increased, power is wasted and danger is incurred. To obviate such difficulties, various clutch mechanisms have been designed to drive the wheels severally and independently of each other by the axle's rotation and to permit them to "overrun" it.

The object of my present invention is to provide an improved clutch mechanism of this general character, which, actuated solely by the relative rotation of the driving axle and other parts, shall automatically, by means of passive and active inertia and with the minimum of friction to retard the action and wear the parts, drive, reverse, modify and govern the speed of the vehicle; and generally, which shall be efficient in all service conditions.

The object of my invention is attained by, and the invention has a preferable embodiment in, the hereinafter described mechanism, illustrated by the accompanying drawings, in which—

Figure 1 is an axial section of my clutch mechanism applied to one end of a driving axle, and taken on line *x—x* of Fig. 2; Fig. 2 is a vertical section of the same on line *z—z* of Fig. 1, and Fig. 3 is a detail view of one of the clutch-dogs with its double pawl.

The gear 2 on the squared extremity of the vehicle driving axle 1, rotated by means not shown, meshes with the segmental gears 3 of a suitable number—three in the construction shown—of clutch dogs 9, each having oppositely acting pawls 4 and pivoted on an annular member 5, balanced against turning by gravity. This annular member is rotatable concentrically the axle and the traction wheel, but independently of such wheel and for a limited arc, of the axle;
and the rotation and the absence of rotation of said member and of the axle are unaffected in such arc, either by the other, excepting through the operation of the clutch dogs; to this end the member 5 may be rotatably mounted on various parts, preferably, however, to freely rotate, as in ball bearings 6 on the non-rotatable sleeve or axle casing 14 in which the axle turns in a bushing 16.

A reinforcing ring 7 carrying the outer ends of the clutch dogs' pivot pins 8 is fastened to the annular member as by bolts 27 passing through separating bosses 28. As the axle is turned either way, the pawls 4, extending in the direction the axle is turning, are, through the passive inertia of the annular member, thrown by the rotation of the gear 2 into engagement with recesses 15 circularly arranged and uniformly spaced and constituting a two-way internal ratchet wheel 10 with curved teeth, uniformly pitched as shown, formed on the interior wall of the hub 11 of the traction wheel whose broken-off spokes are indicated at 12.
A cap 13 threaded on the hub serves to exclude dirt, to retain lubricant, and to hold the axle in place. The hub is hollow, or chambered, as shown, to admit the axle casing and annular member.

In the construction shown the axle casing 14 carries inner race blocks or "cones" 17 and 18 of the ball bearings of the hub 11 and of the annular member 5 respectively, which blocks are retained in proper axial position by shoulders 19 on the axle casing, 20 on the hub, a sleeve 21, and nuts 22 threaded on the axle casing with interposed washer 23 having a tit 24 engaging a keyway slot 25 in the casing to prevent turning.
The annular member 5 is internally threaded to receive the threaded outer race blocks or cone shells 26 of its ball-bearing.

It will be seen that, when the vehicle is propelled by a force other than that acting to rotate the driving axle, as when it is pushed by hand, drawn by another vehicle, etc., or descends a hill by gravity, neither of the pawls of the several dogs will remain in engagement. When the vehicle is at a standstill, the rotation of the driving axle will, on account of the passive inertia of the annular member, as hereinbefore explained, cause the pawls extending in the direction of the axle's rotation to engage and drive the traction wheel. If the axle's rotation continues constant and the wheels "overrun" it, i. e., rotate faster (as in descending a hill), or if the wheel on one side overruns (as the outside wheel on a curve), then any such overrunning wheels will automatically disengage their ratchet wheels from the pawls. The active inertia of the annular member will continue to rotate it with the axle, but as such active inertia is more and more lessened or exhausted, such member will lag behind the axle's speed (if that continue constant) until the axle will operate to again drive such member, and if the traction wheel has now slowed down to the axle speed, it will be driven by the pawls as before.

It will be seen that when the automobile is rounding a curve on a level and at a constant driving speed, the inner traction wheel will be rotated at the same speed with the axle and thus drive the vehicle, the outer wheel overrunning the axle by reason of its necessarily higher speed on a curve with greater radius; also, that the vehicle's speed may be readily reduced by throttling the motor, thus slacking the rotary speed of the axle, by which action (the active inertia of the annular member continuing as explained), the clutch dogs are at once turned to their reverse position, causing the opposite pawls to immediately engage the ratchet wheel; thus, the speed of the vehicle may be controlled at all times by the motive power and may be varied without reversing or stopping such power; it will be seen too, that when the speed is thus slacked on a curve and the outer wheel is held back by the reverse action of its pawls, the inner wheel will disengage its pawls and rotate backward relatively to the axle. The active inertia of the annular member is retarded by a minimum amount of friction on its bearings. It will also be seen that the gear being at all times in operative and positive engagement with the clutch dogs, they are instantly turned by the rotation of the axle into their engaging position; and furthermore, that there is no clutching engagement and disengagement with the gear or axle (which form the driving element), the clutching being effected by the engagement of the pawls with the ratchet wheel and suspended by the disengagement of such parts, the operation of the axle and its gear being merely to actuate or initiate the operation of such clutching means (viz., to "throw" the dogs), and when so actuated to drive the traction wheel thereby.

Not confining myself to the details of construction shown and described, which may be varied without departing from my invention, I claim—

1. A device of the character described comprising a driving axle, an annular member having a limited rotary movement relative to the axle and mounted for free movement independently of the axle, a wheel rotatable independently of the axle and of the annular member, and devices operatively connected to the annular member and rotatable into positive abutting engagement with the wheel to drive the wheel with said member and into a position to permit the wheel to overrun such member, and means intermediate the axle and said devices to actuate the latter to drive the wheel by rotation of the axle in either direction.

2. A device of the character described comprising a driving axle, a driven wheel rotatable independently of the axle and having a two-way ratchet wheel, a non-rotatable sleeve surrounding the axle, an annular member rotatable on the sleeve and independently of the driven wheel and having a free limited rotary movement relative to the axle, a clutch-dog pivoted on the annular member and having oppositely-operative pawls adapted to have positive abutting engagement with the ratchet wheel, and means intermediate the axle and the clutch-dog adapted to throw either pawl into its engagement and to drive the wheel by the rotation of the axle in either direction.

3. A device of the character described comprising a driving axle, a wheel rotatable independently of the axle and having a hollow hub, a non-rotatable sleeve surrounding the axle and extending within the hollow hub, an annular member rotatable on the sleeve and in the hollow hub and independently of the wheel and having a free limited rotary movement relative to the axle, a clutch dog operatively connected to the annular member and adapted to drive the wheel with said member and movable into a position to permit the wheel to overrun such member, and means intermediate the axle and clutch dog to actuate the clutch dog to drive the wheel by the rotation of the axle in either direction.

4. A device of the character described comprising a driving axle, a driven wheel rotatable independently of the axle and having a two-way ratchet wheel and a hollow hub, a non-rotatable sleeve surrounding the axle and extending within the hollow hub, an annular member rotatable on the sleeve and in the hollow hub and independently of the driven wheel and having a free limited rotary movement relative to the axle, a clutch-dog pivoted on the annular member and having oppositely-operative pawls adapted to engage the ratchet wheel, and means intermediate the axle and the clutch-dog adapted to throw either pawl into its engagement and to drive the wheel by the rotation of the axle in either direction.

5. A device of the character described comprising a driving axle, a driven wheel rotatable independently of the axle and having a two-way ratchet wheel, an annular member rotatable independently of the driven wheel and having a free limited rotary movement relative to the axle and mounted independently of the axle for such movement, a clutch-dog pivoted on the annular member and having oppositely-operative pawls adapted to have positive abutting engagement with the ratchet wheel, and means intermediate the axle and the clutch-dog adapted to throw either of the pawls into its engagement and to drive the driven wheel by the rotation of the axle in either direction.

6. A device of the character described comprising a driving axle, an annular member mounted independently of and having a free limited rotary movement relatively to the axle, a wheel rotatable independently of the axle and of said annular member, and a pivoted clutch dog operatively connected to said annular member and rotatable into a position to have positive abutting engagement with and drive the wheel with said member and into a disengaged position to permit the wheel to overrun said member, and means intermediate the axle and clutch dog to rotate the latter to drive the wheel by the rotation of the axle, said annular member being operative by its inherent inertia to effect engagement or disengagement of the slutch dog relatively to the wheel upon the occurrence of relative rotation between said axle and member.

7. A device of the character described comprising a driving axle, an annular member mounted independently of and having a free limited rotary movement relatively to the axle, a wheel rotatable independently of the axle and of said annular member, a pivoted clutch dog operatively connected to said annular member and rotatable into operative position to have positive abutting engagement with and to drive the wheel with said member and rotatable into an inoperative position to permit the wheel to overrun said member, and means intermediate the axle and clutch dog to rotate the latter to drive the wheel by the rotation of the axle, said annular member being operative upon any increased rotative speed of the wheel in either direction alone to effect disengagement of the clutch dog relatively to the wheel.

8. A device of the character described comprising a driving axle, a driven wheel rotatable independently of the axle and having a two-way ratchet wheel, an annular member freely rotatable independently of the driven wheel, and having a free limited rotary movement relative to the axle, a clutch-dog pivoted on the annular member and having oppositely-operative pawls adapted to engage the ratchet wheel, means intermediate the axle and the clutch-dog adapted to throw either of the pawls into its engagement and to drive the driven wheel by the rotation of the axle in either direction, said annular member being operative by its own active inertia or momentum when in motion to alone cause the clutch dog to reverse its engagement with the driven wheel upon reduction in speed of the axle relative to said member.

9. The combination with a driving axle and a wheel rotatable relatively thereto, of a clutch for driving said wheel from the axle embodying a rotatable controlling member mounted for free movement independently of the axle and rotatable relatively to the axle by inertia, and pivoted devices set automatically by such relative rotation between said member and axle to form a positive abutting engagement and driving connection between the axle and the wheel.

10. The combination with a driving axle, a wheel mounted thereon, of a clutch for driving the wheel from the axle embodying a member having a mounting independent of the axle and which permits said member to revolve freely on such mounting, and pivoted devices operative by the axle and controlled by the inherent inertia of said member to form a positive abutting engagement and driving connection between the axle and wheel.

In testimony whereof I have hereunto set my hand in presence of two subscribing witnesses.

WILLIAM A. HATCHER.

Witnesses:
HARRY F. JOHNSON,
MARY S. TOOKER.